United States Patent Office.

GEORGE SANGER, OF BELOIT, WISCONSIN.

Letters Patent No. 92,651, dated July 13, 1869.

---

IMPROVED GERMAN ERASIVE SOAP.

---

The Schedule referred to in these Letters Patent and making part of the same.

---

*To all whom it may concern:*

Be it known that I, GEORGE SANGER, of Beloit, of Rock county, in the State of Wisconsin, have invented certain new and useful Improvements in the Composition and Manufacture of German Erasive Soap; and I do hereby declare the following description to be sufficient to enable any person skilled in the art or science to which it most nearly appertains, to make and use my said invention or improvements, without further invention or experiment.

The nature of my invention and improvements consists in the employment, composition, and manufacture of an improved German erasive soap, composed of the ingredients hereinafter named, and manufactured substantially after the process hereinafter described, to wit:

Put into a steam soap-kettle six hundred and thirty pounds of tallow; add two barrels of alkaline lye, made of soda-ash, or the like, at ten per cent., start steam, and continue boiling and adding the lye until it is thoroughly made into soap; then add three pecks of salt dissolved in water, as strong as you can make it in the pickle, and boil the whole for one hour. This will separate the soap from the spent lye. Stop steam and let stand for two and one-half hours; the soap will then rise to the top of the lye. Then draw the spent lye from the soap, and add three-barrels of good lye to the soap, at thirteen per cent.; then start steam, and add six hundred and thirty pounds of resin, and continue boiling and adding lye until the resin is thoroughly made into soap; then add one and one-half bushel of salt dissolved in water, and boil for two hours, which will separate the soap from the spent lye again. Stop steam and let stand for five hours; then draw the spent lye from the soap, and add three and one-half barrels of lye, at sixteen per cent.; start steam, and keep boiling and adding lye until the soap is so strong that it will take no more strength; then add one and one-half bushel of salt dissolved in water; boil for three hours; stop steam and let stand for fifteen hours; then draw the lye, and add one barrel of water; start steam, and continue boiling and adding a few gallons of water at a time until it is well mixed; then stop steam and let stand twelve hours; then dip the soap into tubs, and add the ingredients below named, and stir until cool, viz:

Four hundred and twenty pounds of sal-soda; one hundred and twenty-five pounds of wheat flour; fifty pounds of whiting; eight pounds of ammonia; one gallon of spirits of turpentine; twenty pounds of plaster of Paris; and twenty pounds of palm oil.

What I claim as my invention and improvements, and desire to secure by Letters Patent, is—

The soap, consisting of the above-enumerated ingredients, in about the proportions set forth, and prepared substantially in the manner herein described and specified.

GEORGE SANGER

Witnesses:
H. P. JOHNSON,
R. F. DUTTON.